US012064970B2

(12) United States Patent
Kubodera

(10) Patent No.: US 12,064,970 B2
(45) Date of Patent: Aug. 20, 2024

(54) LIQUID DISCHARGE DEVICE, LIQUID DISCHARGE APPARATUS, AND LIQUID DISCHARGE HEAD

(71) Applicant: Takaya Kubodera, Kanagawa (JP)

(72) Inventor: Takaya Kubodera, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 98 days.

(21) Appl. No.: 17/944,187

(22) Filed: Sep. 14, 2022

(65) Prior Publication Data

US 2023/0113188 A1 Apr. 13, 2023

(30) Foreign Application Priority Data

Oct. 11, 2021 (JP) ................................ 2021-166834

(51) Int. Cl.
*B41J 2/175* (2006.01)

(52) U.S. Cl.
CPC ................................ *B41J 2/17509* (2013.01)

(58) Field of Classification Search
CPC .... B41J 2/14201; B41J 2/14233; B41J 2/175; B41J 2/17509; B41J 2/17523
See application file for complete search history.

(56) References Cited

U.S. PATENT DOCUMENTS

| | | | | |
|---|---|---|---|---|
| 2006/0109075 | A1* | 5/2006 | Cabal | H01H 61/02 337/333 |
| 2019/0232676 | A1 | 8/2019 | Kubodera et al. | |
| 2019/0291447 | A1 | 9/2019 | Sugiura | |

FOREIGN PATENT DOCUMENTS

| | | | |
|---|---|---|---|
| JP | 2-263655 | | 10/1990 |
| JP | 2012-179894 | | 9/2012 |
| JP | 2016-187892 | A | 11/2016 |
| WO | WO2015/194496 | A1 | 12/2015 |

OTHER PUBLICATIONS

Extended European Search Report issued Feb. 21, 2023 in European Patent Application No. 22193198.3, 10 pages.

* cited by examiner

*Primary Examiner* — Anh T Vo
(74) *Attorney, Agent, or Firm* — XSENSUS LLP

(57) ABSTRACT

A liquid discharge device includes a liquid discharge head and a head tank. The head tank stores liquid to be supplied to the liquid discharge head. The head tank includes a body, a film, and a cover. The body includes a hole. The film covers the hole and includes a fixed portion fixed to the body. The cover contacts the film from an outer surface of the film. The cover includes a fixing-side cover part to contact a portion adjacent to the fixing portion of the film. The fixing-side cover part includes a curved contact surface to contact the film.

16 Claims, 10 Drawing Sheets

LIQUID DISCHARGE DEVICE, LIQUID DISCHARGE APPARATUS, AND LIQUID DISCHARGE HEAD

CROSS-REFERENCE TO RELATED APPLICATIONS

This patent application is based on and claims priority pursuant to 35 U.S.C. § 119(a) to Japanese Patent Application No. 2021-166834, filed on Oct. 11, 2021, in the Japan Patent Office, the entire disclosure of which is hereby incorporated by reference herein.

BACKGROUND

Technical Field

Embodiments of the present disclosure relate to a liquid discharge device, a liquid discharge apparatus including the liquid discharge device, and a liquid discharge head.

Related Art

A technology is known in which a head tank that supplies liquid to a liquid discharge head includes a damper film for reducing fluctuations in the volume of the head tank when the pressure in the head tank fluctuates.

For example, a technology has been proposed in which a buffer film serves as a part of a wall surface of a common ink chamber disposed in an ink head, and a regulating member that regulates deformation of the buffer film is disposed outside the buffer film with a gap between the buffer film and the regulating member. The regulating member has a shape obtained by forming a flat plate into an L-shape.

SUMMARY

In an embodiment of the present disclosure, a liquid discharge device includes a liquid discharge head and a head tank. The head tank stores liquid to be supplied to the liquid discharge head. The head tank includes a body, a film, and a cover. The body includes a hole. The film covers the hole and includes a fixed portion fixed to the body. The cover contacts the film from an outer surface of the film. The cover includes a fixing-side cover part to contact a portion adjacent to the fixing portion of the film. The fixing-side cover part includes a curved contact surface to contact the film.

In another embodiment of the present disclosure, a liquid discharge head includes a liquid container, a film, and a cover. The liquid container includes a hole. The film covers the hole and includes a fixed portion fixed to the liquid container. The cover contacts the film from an outer surface of the film. The cover includes a fixing-side cover part to contact a portion adjacent to the fixed portion of the film. The fixing-side cover part includes a curved contact surface to contact the film.

In still another embodiment of the present disclosure, a liquid discharge head includes a liquid container, a film, and a cover. The liquid container includes a hole. The film covers the hole and includes a fixed portion fixed to the liquid container. The cover contacts the film from an outer surface of the film. The cover includes a fixing-side cover part to contact a portion adjacent to the fixed portion of the film. The fixing-side cover part includes three or more plane portions to contact the film with a contact angle formed by adjacent two of the three or more contact surfaces being 90 degrees or more.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
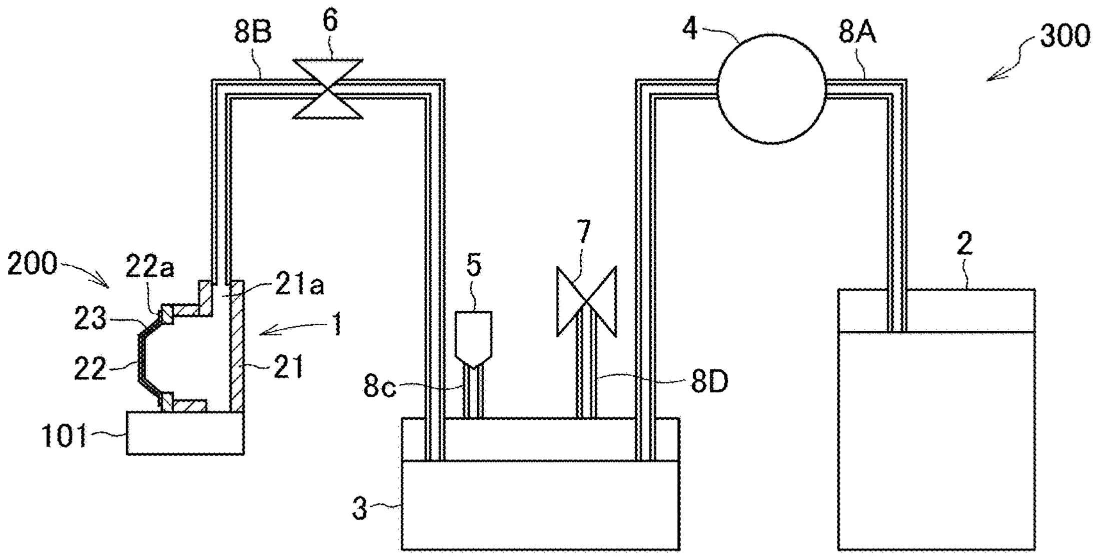
FIG. 1 is a schematic diagram illustrating a configuration of a liquid discharge apparatus including a liquid discharge head, according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings in the following description. Note that, in the drawings, like reference numerals denote like components and redundant or overlapping descriptions of those components may be simplified or omitted as appropriate.

As illustrated in FIG. 1, a liquid discharge apparatus 300 includes, for example, a liquid discharge device 200, a cartridge 2, a sub tank 3, a liquid feed pump 4, an air pump 5, an electromagnetic valve 6, an air release valve 7. The liquid discharge device 200 includes, for example, a liquid discharge head 101 and a head tank 1. The liquid discharge head 101 is also referred to simply as a head 101 in the following description.

The head tank 1 includes a supply port 21*a* in an upper portion of the head tank 1. The head tank 1 is connected to a head supply path 8B at the position of the supply port 21*a*.

The cartridge 2 is connected to the sub tank 3 via a sub-tank feed path 8A. A liquid feed pump 4 is disposed midway through the sub-tank feed path 8A.

The sub tank 3 is connected to the air pump 5 via an air path 8C. The sub tank 3 is connected to the air release valve 7 via an air release path 8D. The sub tank 3 is connected to the head tank 1 via the head supply path 8B. The electromagnetic valve 6 is disposed midway through the head supply path 8B.

When the liquid feed pump 4 is driven, ink as liquid in the cartridge 2 is supplied to the sub tank 3 through the sub-tank feed path 8A. The ink in the sub tank 3 is supplied to the head tank 1 through the head supply path 8B.

When a maintenance operation of the head 101 is performed, the air pump 5 is driven to pressurize the inside of the sub tank 3 in a state in which the electromagnetic valve 6 and the air release valve 7 are closed. When the pressure in the sub tank 3 reaches a predetermined pressure, the electromagnetic valve 6 is opened to discharge the ink in the head 101 outside of the head 101. When discharging of the ink is completed, the air release valve 7 is opened to return the pressure in the sub tank 3 to the atmospheric pressure.

Note that the pressure in the head tank 1 fluctuates, for example, when the maintenance operation of the head 101 is performed or when the ink in the sub tank 3 is replenished to the head tank 1. A damper film 22 and a cover 23 are disposed in the head tank 1 to absorb the pressure fluctuation in the head tank 1.

The structure in the head tank 1 including the damper film 22 and the structure of the head 101 are described below with reference to FIG. 2 in the following description.

Figure 2:
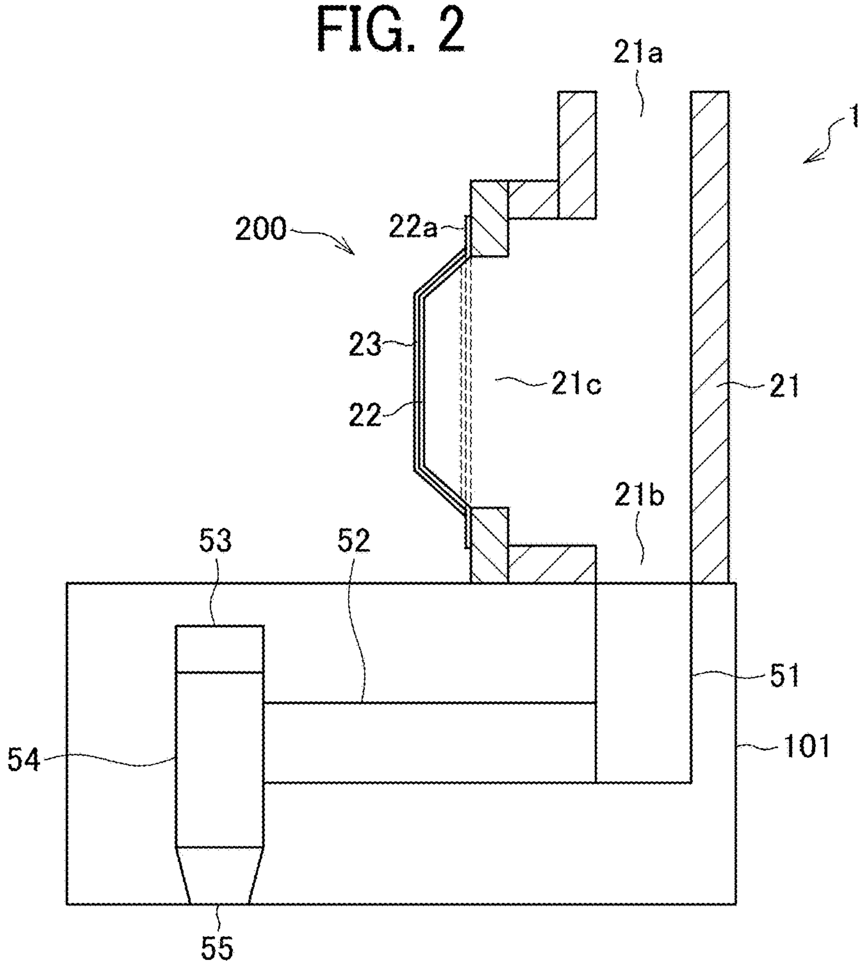
FIG. 2 is an enlarged view of a liquid discharge device provided for the liquid discharge apparatus of FIG. 1, according to an embodiment of the present disclosure.

As illustrated in FIG. 2, the head tank 1 includes a body 21 that serves as an exterior portion of the head tank 1. A damper film 22 that serves as a film, and a cover 23.

The body 21 includes a supply port 21*a*, a liquid introduction port 21*b*, and a hole 21*c*. The head tank 1 is connected to a common channel 51 of the head 101 via the liquid introduction port 21*b*.

The head 101 includes, for example, the common channel 51, multiple piezoelectric elements 53, pressure generation chambers 54, and nozzle orifices 55.

Ink supplied from the head tank 1 to the head 101 is supplied to the pressure generation chambers 54 through the common channel 51 and individual channels 52. When the multiple piezoelectric elements 53 disposed immediately above the pressure generation chambers 54 are deformed by signals, the pressure in the pressure generation chambers 54 is changed to discharge the ink in the pressure generation chambers 54 from the nozzle orifices 55.

The damper film 22 is disposed to cover the hole 21*c* of the body 21. A fixing portion 22*a* on edges of the damper film 22 is welded and fixed to the body 21. However, the method of fixing the damper film 22 to the body 21 is not limited to the above-described configuration. For example, the damper film 22 may be bonded to the body 21 with an adhesive. The damper film 22 is formed of an elastic material. In addition, a cover 23 is disposed to contact an outer surface (a surface facing the left side in FIG. 2) of the damper film 22. Note that in FIG. 2, a state in which the damper film 22 bulges outward due to, for example, the above-described maintenance operation is illustrated in a simplified manner. However, detailed shapes of the damper film 22 and the cover 23 and how the damper film 22 and the cover 23 are deformed are described below.

Figure 3:
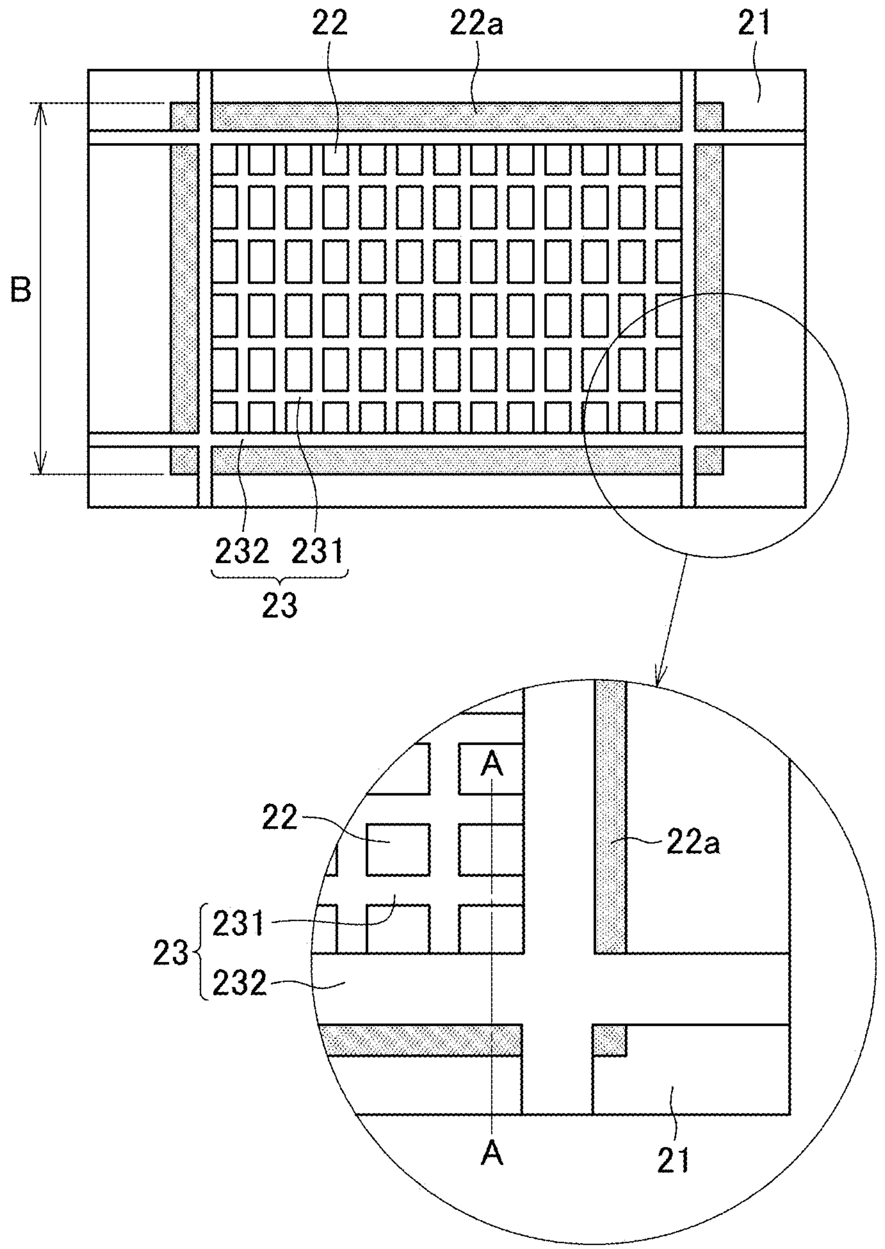
FIG. 3 is a plan view of a damper film and a cover provided for a head tank, as viewed from the left side of FIG. 2, according to an embodiment of the present disclosure.

FIG. 3 is a plan view of the damper film 22 and the cover 23 viewed from the left side of FIG. 2, according to the present embodiment. As illustrated in FIG. 3, the fixing portion 22*a*, which is disposed circumferentially on the edges of the damper film 22, is welded and fixed to the body 21.

The cover 23 includes a center-side cover part 231 and a fixing-side cover part 232. The cover 23 is formed of an elastic material and is formed of a silicone rubber in the present embodiment. The fixing-side cover part 232 contacts a portion of the damper film 22 closer to the fixing portion 22*a* (the vicinity of the fixing portion 22*a*) than the center-side cover part 231. Particularly in the present embodiment, the fixing-side cover part 232 contacts a portion adjacent to the fixing portion 22*a* of the damper film 22.

The center-side cover part 231 includes linear portions in a meshed pattern. The fixing-side cover part 232 includes linear portions and is disposed to surround the center-side cover part 231. In other words, the fixing-side cover part 232 serves as a window frame disposed adjacent to the fixing portion 22*a* of the damper film 22 to surround an inner portion of the damper film 22 with respect to the fixing portion 22*a*. Each gap between adjacent ones of the linear portions of the center-side cover part 231 has a substantially equal interval. Ends of each of the linear portions of the center-side cover part 231 are connected to the linear portions of the fixing-side cover part 232 surrounding the center-side cover part 231, and the center-side cover part 231 and the fixing-side cover part 232 are unified.

The width of the fixing-side cover part 232 is larger than the width of the center-side cover part 231. Note that the width of the fixing-side cover part 232 or the center-side cover part 231 in the present embodiment refers to a length in a short-side direction that is a direction orthogonal to a longitudinal direction of the linear portions of the fixing-side cover part 232 and the center-side cover part 231.

Figure 4:
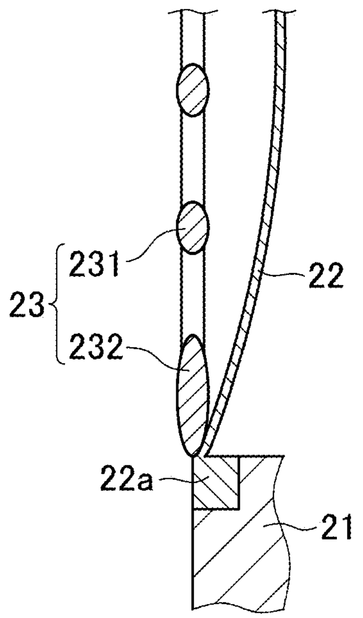
FIG. 4 is a cross-sectional view of the head tank of FIG. 3, taken along line A-A in FIG. 3, in which the damper film is in a normal state.
Figure 5:
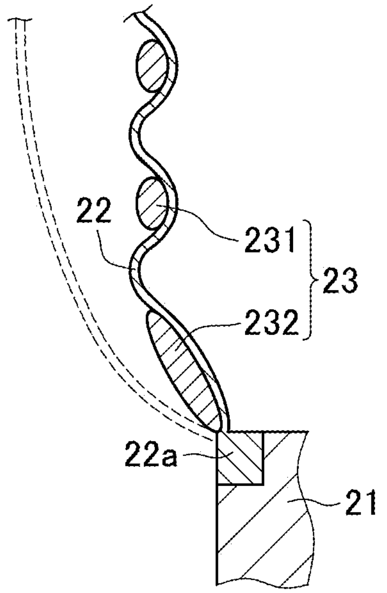
FIG. 5 is a cross-sectional view of the head tank of FIG. 3, taken along line A-A of FIG. 3, in a state in which the damper film is deformed.

FIG. 4 and FIG. 5 are cross-sectional views taken along line A-A of the enlarged view of FIG. 3. FIG. 4 is a cross-sectional view of the damper film 22 and the cover 23 in which the damper film 22 is in a normal state, in other words, a state in which the pressure fluctuation in the head tank 1 due to, for example, the maintenance operation does not occur. FIG. 5 is a cross-sectional view of the damper film 22 and the cover 23 in which the damper film 22 is elastically deformed due to the pressure fluctuation in the head tank 1.

As illustrated in FIG. 4, when the damper film 22 is in the normal state as described above, the head tank 1 has a negative pressure inside of the head tank 1, and the damper film 22 has a concave shape that is dented inward.

When the pressure in the head tank 1 changes from the state illustrated in FIG. 4, the damper film 22 bulges outward as illustrated in FIG. 5. Accordingly, curved surfaces of the center-side cover part 231 and the fixing-side cover part 232 contact the damper film 22 at corresponding positions from outside of the damper film 22. Accordingly, deformation of the damper film 22 can be reduced. For example, when the cover 23 is not provided for the damper film 22, the damper film 22 is deformed as indicated by dotted lines in FIG. 5. By contrast, when the cover 23 is provided for the damper film 22, the deformation of the damper film 22 can be reduced as indicated by solid lines in FIG. 5. Note that the radius of curvature of the curved surface of the fixing-side cover part 232 is set to be larger than a length B (see FIG. 3) of the short-side length of the damper film 22.

In the case in which the damper film 22 is fixed to the body 21 by the fixing portion 22*a* as described above, when the damper film 22 is deformed due to the pressure fluctuation in the head tank 1, an excessive force may be applied to the fixing portion 22*a*, and a breakage such as the rupture of the damper film 22 may occur at the portion at which the damper film 22 is fixed to the body 21 by the fixing portion 22*a*. On the contrary, the cover 23 is provided for the damper film 22 as described above to reduce the deformation of the damper film 22. Accordingly, the rupture of the damper film 22 can be reduced.

However, depending on the shape of the cover 23, the rupture of the damper film 22 may not be sufficiently reduced, or the risk of the rupture of the damper film 22 may be increased.

Figure 6:
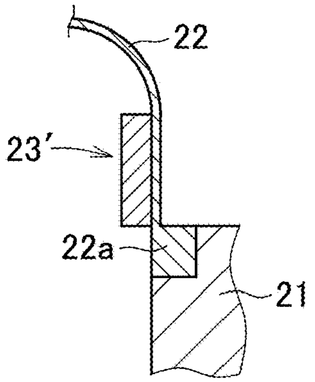
FIG. 6 is a cross-sectional view of a cover according to another embodiment of the present disclosure.

For example, a cover 23' illustrated in FIG. 6 has a shape different from the cover 23 according to the present embodiment, and contacts the damper film 22 by a flat surface portion of the cover 23'. Further, the cover 23' contacts only the fixing portion 22*a* of the damper film 22. In other words, the cover 23' includes only a portion corresponding to the fixing-side cover part 232 of the cover 23 of the present embodiment.

The cover 23' having such a configuration described above can also reduce the deformation of the damper film 22. However, the pressure applied to the portion of the damper film 22 at which the deformation of the damper film 22 is reduced by the cover 23', in other words, the pressure applied to the portion of the damper film 22 that contacts the cover 23' is increased. Accordingly, this portion of the damper film 22 is likely to be ruptured.

On the other hand, in the present embodiment, as illustrated in FIG. 5, the fixing-side cover part 232 that contacts the fixing portion 22*a* of the damper film 22 includes curved surfaces. Such a configuration as described above can reduce the pressure of the portion of the damper film 22 that contacts the fixing-side cover part 232. In other words, when the cover 23' contacts the damper film 22 with the flat surface portion of the cover 23' as illustrated in FIG. 6, the damper film 22 is unlikely to be deformed at the portion at which the cover 23' contacts the damper film 22. For this reason, the difference in deformation amount between the portion at which the cover 23' contacts the damper film 22 and a portion at which the cover 23' does not contact the damper film 22 is large and the pressure applied to the portion at which the cover 23' contacts the damper film 22 is excessive, which may cause the rupture of the damper film 22. On the other hand, as in the present embodiment, the curved surfaces of the center-side cover part 231 and the fixing-side cover part 232 of the cover 23 contact the damper film 22. Accordingly, the damper film 22 can be gently deformed at the contact positions. Accordingly, the pressure applied to the portions of the damper film 22 that contact the curved surfaces of the center-side cover part 231 and the fixing-side cover part 232 of the cover 23 can be reduced. Thus, damage such as the rupture of the damper film 22 can be effectively reduced.

Further, in the present embodiment, the center-side cover part 231 contacts a center portion of the damper film 22. Accordingly, deformation on the center portion of the damper film 22 can be reduced, and the pressure applied to the fixing portion 22*a* of the damper film 22 can be reduced.

However, in the configuration in which the center-side cover part 231 is disposed as described above, when the deformation of the damper film 22 on the center portion of the damper film 22 is excessively reduced, the damper film 22 cannot sufficiently absorb the pressure fluctuation in the head tank 1. In the present embodiment, the center-side cover part 231 is formed in the mesh shape to prevent such a disadvantage as described above. Accordingly, when the pressure in the head tank 1 fluctuates, a portion of the damper film 22 that contacts the center-side cover part 231 such that the deformation of the portion is significantly reduced and a portion of the damper film 22 that does not contact the center-side cover part 231 can be alternately disposed on the center portion of the damper film 22. Accordingly, the area in which the center-side cover part 231 contacts the damper film 22 can be increased while allowing the center portion of the damper film 22 to be partially deformed. Such a configuration as described above can obtain the effect of absorbing the pressure fluctuation in the head tank 1 by the damper film 22, and the deformation of the center portion of the damper film 22 can be reduced. Thus, damage such as the rupture of the damper film 22 can be effectively reduced.

Further, in the present embodiment, as described above, the cover 23 is formed of the elastic material. Accordingly, the portion of the damper film 22 that contacts the cover 23 can be flexibly deformed. However, the cover 23 is not necessarily formed of the elastic material.

Further, in the present embodiment, as described above, the width of the fixing-side cover part 232 is larger than the width of the center-side cover part 231. Accordingly, the area in which the fixing-side cover part 232 contacts the damper film 22 can be increased, and the pressures received by the damper film 22 in an area of the damper film 22 close to the fixing portion 22*a* can be reduced. Accordingly, the rupture of the damper film 22 can be effectively reduced. However, the width of the fixing-side cover part 232 does not necessarily have to be larger than the width of the center-side cover part 231.

Further, in the present embodiment, as described above, the radius of curvature of the curved surfaces of the fixing-side cover part 232 is set to be larger than the length B (see FIG. 3) of the short-side length of the damper film 22. The radius of curvature of the curved surfaces of the fixing-side cover part 232 is set to an appropriate size with respect to the damper film 22 with which the fixing-side cover part 232 contacts. Accordingly, the pressure applied to the damper film 22 can be effectively reduced. Accordingly, the rupture of the damper film 22 can be effectively reduced. However, the radius of curvature of the curved surfaces of the fixing-side cover part 232 does not necessarily have to be larger than the length of the short-side length of the damper film 22.

In the above-described embodiments, the case has been described in which each of the entire surfaces of the center-side cover part 231 and the fixing-side cover part 232 have the curved surfaces when viewed in a cross section orthogonal to the longitudinal direction of each linear portion. However, the center-side cover part 231 does not necessarily have to have the curved surfaces. In addition, the entire portion of the fixing-side cover part 232 that contacts the damper film 22 does not need to be formed of the curved surfaces.

Figure 7:
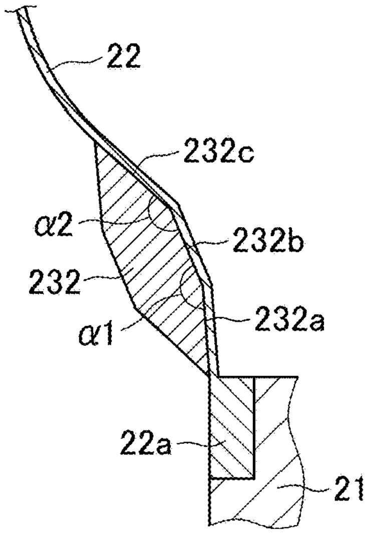
FIG. 7 is a cross-sectional view of a cover according to still another embodiment of the present disclosure.

In the above-described embodiments, the surface of the cover 23 includes curved portions. However, the present disclosure is not limited to such a configuration. For example, as illustrated in FIG. 7, the fixing-side cover part 232 of the cover 23 contacts the damper film 22 through plane portions 232*a*, 232*b*, and 232*c*. Each of a contact angle α1 formed by the plane portions 232*a* and 232*b* and a contact angle α2 formed by the plane portion 232*b* and 232*c* is set to 90 degrees or more. The contact angles α1 and α2 are formed by portions of the surface of the fixing-side cover part 232 that contact the damper film 22 and the damper film 22, respectively.

Such a configuration as described above in which the fixing-side cover part 232 contacts the damper film 22 through the three plane portions 232*a*, 232*b*, and 232*c* and the angle of the contact angles α1 and α2 are set to 90 degrees or more allows the damper film 22 to be deformed moderately when the damper film 22 expands, and the pressure applied to the portion of the damper film 22 that contacts the fixing-side cover part 232 to be reduced. Accordingly, the rupture of the damper film 22 can be effectively reduced. Note that the fixing-side cover part 232 contacts the damper film 22 through the three plane portions 232*a*, 232*b*, and 232*c* or the contact angles α1 and α2 are 90 degrees or more means that there are three plane portions that contact the damper film 22 or the angle of each of the contact angles α1 and α2 formed by the three plane portions 232*a*, 232*b*, and 232*c* is set to 90 degrees or more when viewed in a cross section orthogonal to the longitudinal direction of the fixing-side cover part 232 that contacts the damper film 22 (e.g., the cross section as illustrated in FIG. 7) or a cross section orthogonal to the short-side direction (e.g. the cross section orthogonal to the vertical direction in FIG. 3) of the fixing-side cover part 232 that contacts the damper film 22 in a state in which no pressure fluctuation occurs in the head tank 1 due to, for example, the maintenance operation.

Figure 8:
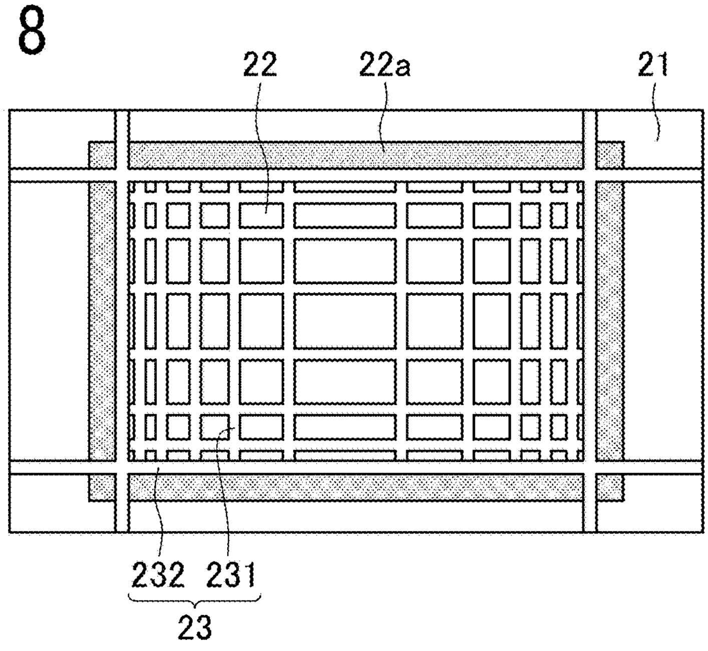
FIG. 8 is a plan view of a cover according to still another embodiment of the present disclosure.

Further, in the above-described embodiments, the linear portions of the center-side cover part 231 are arranged at equal intervals. However, the present disclosure is not limited to such a configuration. For example, in the embodiment illustrated in FIG. 8, intervals between the linear portions of the center-side cover part 231 are wider toward the center of the damper film 22 in the longitudinal direction, which is a left-right direction in FIG. 8. In other words, the linear portions of the center-side cover part 231 are more densely arranged in an area closer to the fixing-side cover part 232 than in an area close to the center of the damper film 22 in the longitudinal direction of the damper film 22. Such a configuration as described above allows the cover 23 to restrict the deformation of the damper film 22 more moderately toward the center of the damper film 22. Accordingly, when the ink is replenished into the head tank 1, the pressure fluctuation in the head tank 1 can be absorbed to reduce the influence of the pressure fluctuation in the head 101. Thus, the ink can be prevented from leaking from the nozzle orifices 55 of the head 101. Further, the intervals between the linear portions of the center-side cover part 231 may increase toward the center of the damper film 22 in the short-side direction. Alternatively, the linear portions of the center-side cover part 231 may be irregularly arranged, or the center-side cover part 231 may not necessarily include the linear portions.

In the above-described embodiments, the cases have been described in which the damper film 22 as a film and the center-side cover part 231 and the fixing-side cover part 232 are disposed in the head tank 1. However, a film and a cover may be disposed in a liquid container such as a common liquid chamber disposed in the liquid discharge head. In other words, a liquid discharge head may have a configuration in which the liquid discharge head includes a channel provided with a common liquid chamber, instead of the head tank 1 of FIG. 2, that communicates with the common channel 51 and the above-described film or the cover may be disposed in a hole of the common liquid chamber. Such a liquid discharge head as described above can also reduce the rupture of the film.

Next, an example of a liquid discharge head or a liquid discharge device having the above-described damper film as a film and the cover, or a liquid discharge apparatus including the liquid discharge head or the liquid discharge device are described with reference to FIGS. 9, 10, 11, 12, 13, 14, and 15.

Figure 9:
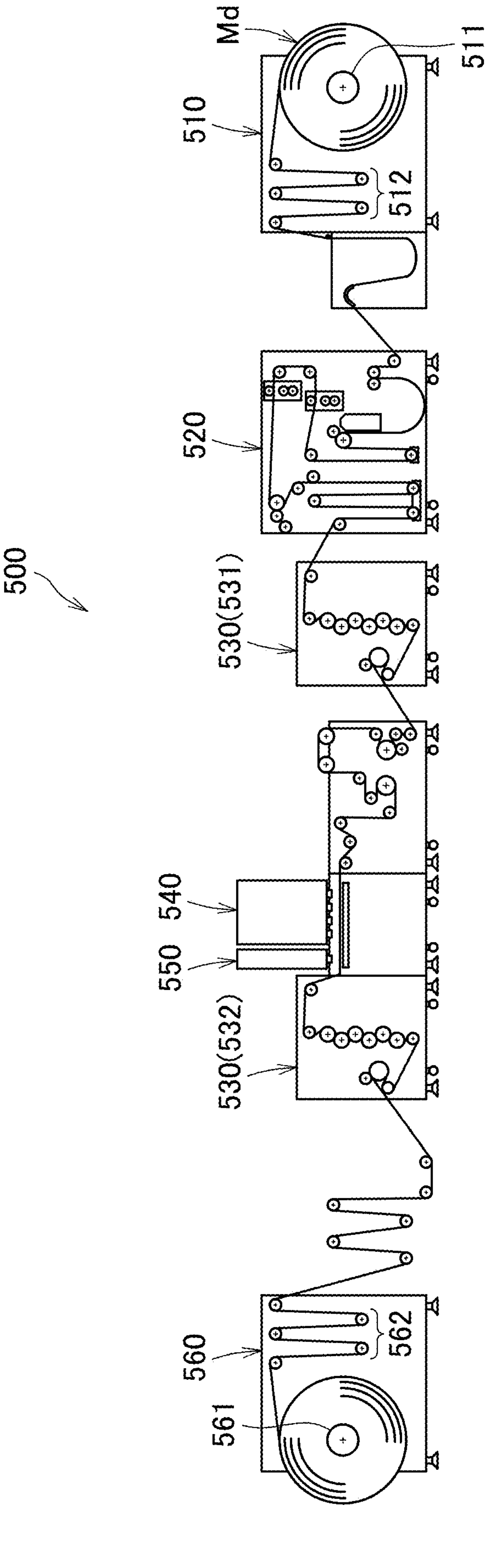
FIG. 9 is a schematic diagram illustrating a configuration of an image forming apparatus according to an embodiment of the present disclosure.

FIG. 9 is a schematic diagram illustrating a configuration of an image forming apparatus 500 as a liquid discharge apparatus, according to an embodiment of the present disclosure. In the present embodiment, the image forming apparatus 500 having liquid discharge heads of four colors of black (K), cyan (C), magenta (M), and yellow (Y) is described. However, an image forming apparatus according to an embodiment of the present disclosure is not limited to an apparatus having such discharge heads. In other words, the image forming apparatus may further include discharge heads corresponding to green (G), red (R), light cyan (LC), or other colors, or may include a discharge head only for black (K) color. In the present embodiment, symbols with suffixes K, C. M, and Y correspond to black, cyan, magenta, and yellow, respectively.

Further, in the present embodiment, a continuous sheet of paper, which is referred to as a roll sheet Md in the following description, wound in a roll shape is used as a recording medium to which liquid can adhere. In the present embodiment, the roll sheet Md is a continuous sheet such as a continuous form sheet, a continuous form sheet in which cuttable perforations are formed at predetermined intervals. Further, a page in the roll sheet Md is, for example, an area delimited by perforations at a predetermined interval.

As illustrated in FIG. 9, the image forming apparatus 500 according to the present embodiment includes a feeder 510, a pretreatment liquid application device 520, a drier 530, a head unit 540 as an image forming device, a protector coating liquid application device 550, a protector coating liquid drier 532, and a carrier 560. The feeder 510 carries in the roll sheet Md. The pretreatment liquid application device 520 applies pretreatment liquid to the conveyed roll sheet Md. In other words, the pretreatment liquid application device 520 performs pretreatment on the roll sheet Md. A pretreatment liquid drier 531 of the drier 530 dries the pretreated roll sheet Md. The head unit 540 as the image forming device forms an image on the surface of the roll sheet Md. The protector coating liquid application device 550 applies protector coating liquid to the entire or a part of surface of the roll sheet Md on which an image has been formed. In other words, the protector coating liquid application device 550 performs post-processing of discharging the protector coating liquid to the entire or a part of the surface of the roll sheet Md. The carrier 560 carries out the post-processed roll sheet Md. Further, the image forming apparatus 500 includes a controller that controls the operation of the image forming apparatus 500.

In the image forming apparatus 500 according to the present embodiment, the roll sheet Md is carried in by the feeder 510, and the surface of the roll sheet Md is pretreated by the pretreatment liquid application device 520 and dried by the pretreatment liquid drier 531. The image forming apparatus 500 forms an image on the surface of the roll sheet Md, which has been pretreated and dried, by the head unit 540. Further; in the present embodiment, the image forming apparatus 500 performs the post-processing on the surface of the roll sheet Md on which an image has been formed by the protector coat liquid application device 550. Subsequently, the protector coating liquid drier 532 dries the protector coating liquid that has been applied to the surface of the roll sheet Md. Then, the image forming apparatus 500 winds the roll sheet Md by the carrier 560. In other words, the image forming apparatus 500 discharges or carries out the roll sheet Md by the carrier 560.

Note that the image forming apparatus 500 according to the present embodiment controls the operations of the protector coating liquid application device 550 and the protector coating liquid drier 532 based on at least the glossiness of an image portion and a non-image portion formed on the recording medium. Alternatively, the image forming apparatus 500 may not include one or more of devices such as the pretreatment liquid application device 520 described below.

The feeder 510 conveys the recording medium to, for example, the pretreatment liquid application device 520. In the present embodiment, the feeder 510 includes, for example, a sheet feeder 511 and multiple conveyance rollers 512. The feeder 510 carries in the roll sheet Md held by being wound around a sheet feed roll of the sheet feeder 511 using, for example, the conveyance roller 512, and conveys the roll sheet Md to the pretreatment liquid application device 520.

The pretreatment liquid application device 520 treats the recording medium before an image is formed on the recording medium. In the present embodiment, the pretreatment liquid application device 520 performs pretreatment with the pretreatment liquid on the surface of the roll sheet Md conveyed by the feeder 510. In the present embodiment, the pretreatment is processing of uniformly applying the pretreatment liquid (described later) having a function of condensing ink to the surface of the roll sheet Md.

The pretreatment liquid application device 520 of the image forming apparatus 500 according to the present embodiment can control the amount of the pretreatment liquid to be applied based on image data. Accordingly, in a case in which an image is formed on a recording medium other than a sheet of paper specialized for inkjet printing, the image forming apparatus 500 can apply the pretreatment liquid having the function of condensing ink to the surface of the recording medium using the pretreatment liquid application device 520 before forming the image on the recording medium. For this reason, the image forming apparatus 500 can reduce occurrence of quality disadvantages related to such as bleeding, density, color tone, and bleed-through of an image to be formed, and other disadvantages related to water resistance, weather resistance, and image fastness. In other words, the image forming apparatus 500 applies the pretreatment liquid having a function of condensing ink before an image is formed on a recording medium using the pretreatment liquid application device 520. Accordingly, the image forming apparatus 500 can enhance the quality of an image to be formed.

Note that the image forming apparatus 500 may use the pretreatment liquid application device 520 to apply the pretreatment liquid having a function of condensing ink before forming an image on a sheet of paper (recording medium) specialized for inkjet printing.

Figure 10:
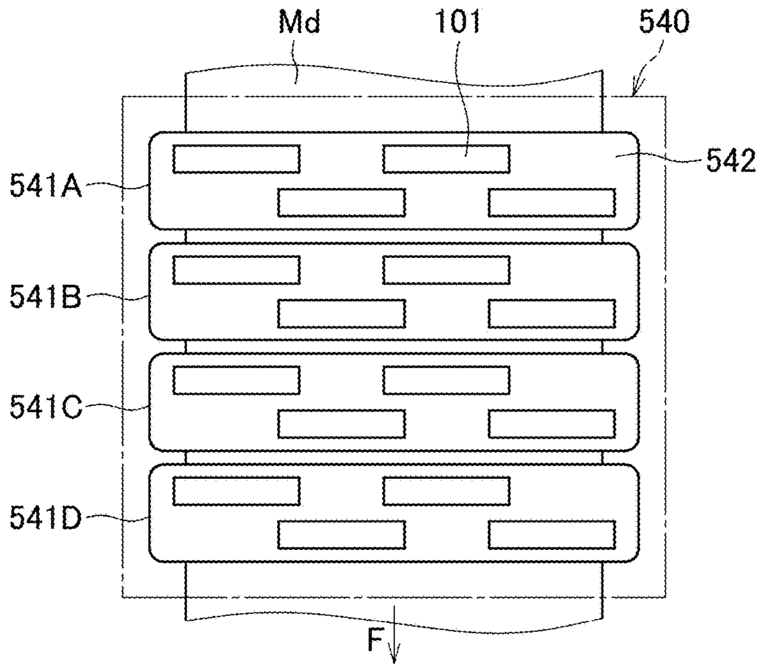
FIG. 10 is a plan view of a head device according to an embodiment of the present disclosure.

As illustrated in FIG. 10, in the head unit 540 as the image forming device, for example, full-line head arrays 541A, 541B, 541C, and 541D for four colors are arranged from upstream in a conveyance direction F. When colors of the head arrays 541A, 541B, 541C, and 541D are not distinguished, they are referred to simply as a head array 541 in the following description.

Each of the head arrays 541A, 541B, 541C, and 541D is a liquid discharger and discharges liquid of black (K), cyan (C), magenta (M), and yellow (Y) to the conveyed roll sheet Md. Note that the type and number of colors are not limited to the above-described example.

In each of the head arrays 541A, 541B, 5410, and 541D, for example, the liquid discharge heads 101 are arranged in a staggered manner on a base 542. However, the present disclosure is not limited to such a configuration.

Figure 11:
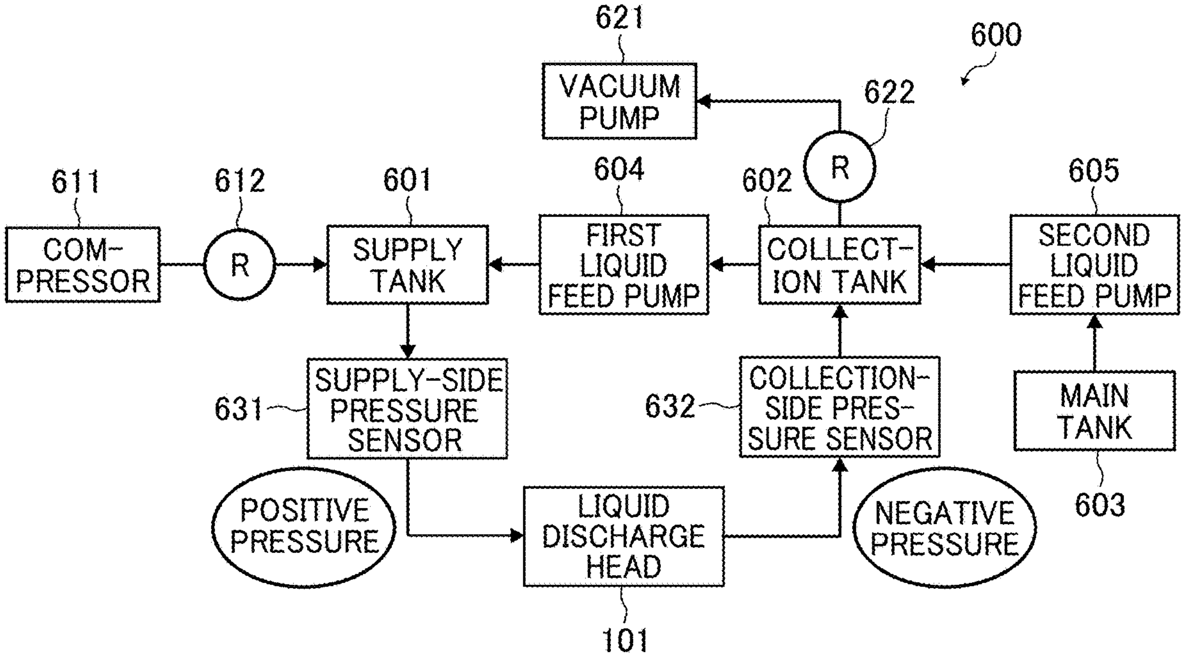
FIG. 11 is a block diagram of a liquid circulation device according to an embodiment of the present disclosure.

Next, an example of a liquid circulation device according to an embodiment of the present disclosure is described below with reference to FIG. 11. FIG. 11 is a block diagram of a liquid circulation device 600. Note that only one liquid discharge head 101 is illustrated in FIG. 11. However, in a case in which multiple liquid discharge heads 101 are arranged, a supply-side liquid path and a collection-side liquid path are connected to a supply side and a collection side of the multiple liquid discharge heads 101, respectively via a manifold.

The liquid circulation device 600 includes, for example, a supply tank 601, a collection tank 602, a main tank 603, a first liquid feed pump 604, a second liquid feed pump 605, a compressor 611, a regulator 612, a vacuum pump 621, a regulator 622, a supply-side pressure sensor 631, and a collection-side pressure sensor 632.

In the present embodiment, the compressor 611 and the vacuum pump 621 together generate a pressure difference between the pressure in the supply tank 601 and the pressure in the collection tank 602.

The supply-side pressure sensor 631 is connected between the supply tank 601 and the liquid discharge head 101 and is connected to the supply-side liquid path connected to a supply port of the liquid discharge head 101. The collection-side pressure sensor 632 is connected between the liquid discharge head 101 and the collection tank 602 and is connected to the collection-side liquid path that is connected to a collection port 72 of the liquid discharge head 101.

One end of the collection tank 602 is connected to the supply tank 601 via the first liquid feed pump 604, and the other end of the collection tank 602 is connected to the main tank 603 via the second liquid feed pump 605.

Accordingly, liquid flows into the head 101 from the supply tank 601 through the supply port. Then, the liquid is recovered from the collection port 72 to the collection tank 602 and is fed from the collection tank 602 to the supply tank 601 by the first liquid feed pump 604. Thus, a circulation path through which the liquid circulates is formed.

In the present embodiment, the compressor 611 is connected to the supply tank 601 and is controlled so that a predetermined positive pressure is detected by the supply-side pressure sensor 631. On the other hand, the vacuum pump 621 is connected to the collection tank 602 and is controlled so that a predetermined negative pressure is detected by the collection-side pressure sensor 632.

Such a configuration as described above allows the negative pressure of meniscus to be kept constant while the liquid is circulated through the head 101.

When the liquid is discharged from the nozzle orifices of the head 101, the amount of the liquid in the supply tank 601 and the collection tank 602 decreases. Accordingly, the liquid is replenished from the main tank 603 to the collection tank 602 as needed using the second liquid feed pump 605.

Note that the timing at which the liquid is replenished from the main tank 603 to the collection tank 602 can be controlled by, for example, a detection result of a liquid level sensor disposed in the collection tank 602. For example, the liquid is replenished when the height of liquid surface of the liquid in the collection tank 602 falls below a predetermined height.

Figure 12:
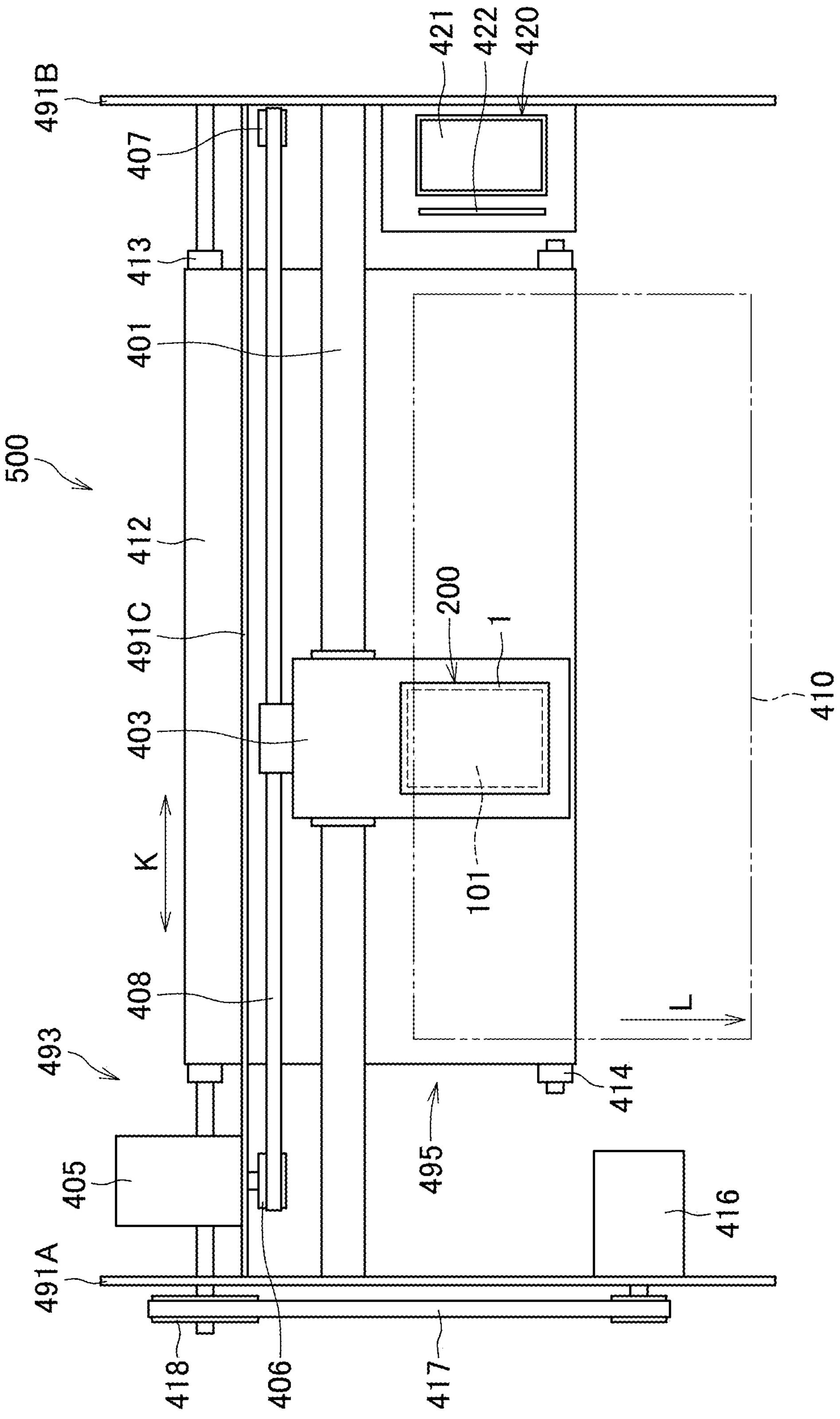
FIG. 12 is a plan view of a relevant part of an image forming apparatus according to another embodiment of the present disclosure.
Figure 13:
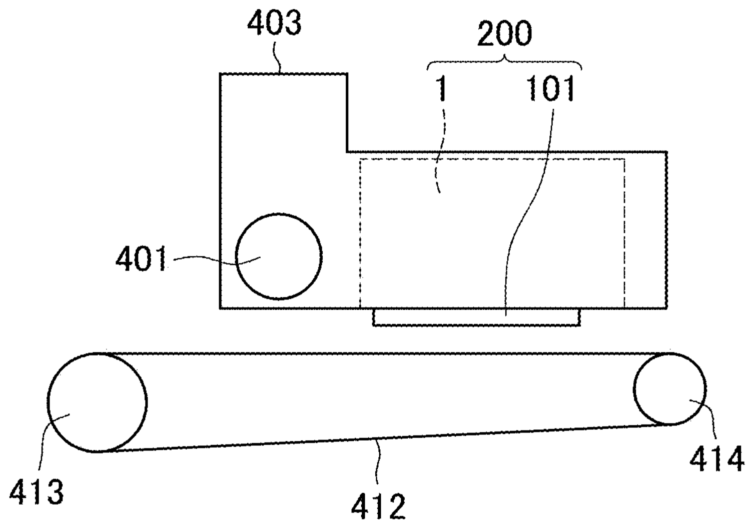
FIG. 13 is a side view of the relevant part of the image forming apparatus of FIG. 12.

Next, another example of the image forming apparatus 500 as the liquid discharge apparatus according to an embodiment of the present disclosure is described with reference to FIGS. 12 and 13. FIG. 12 is a plan view of a relevant part of the image forming apparatus 500 according to the present embodiment. FIG. 13 is a side view of a relevant part of the image forming apparatus 500 according to the present embodiment.

The image forming apparatus 500 is a serial-type image forming apparatus, and a carriage 403 is reciprocated in a main scanning direction D by a main-scanning moving mechanism 493. The main-scanning moving mechanism 493 includes, for example, a guide 401, a main-scanning motor 405, and a timing belt 408. The guide 401 is bridged between side plates 491A and 491B disposed at a left and a right side of the image forming apparatus 500, respectively, and movably holds the carriage 403. The carriage 403 is reciprocated in the main scanning direction D by the main-scanning motor 405 via the timing belt 408 stretched between a driving pulley 406 and a driven pulley 407.

A liquid discharge device 200 including the liquid discharge head 101 and the head tank 1 as a single unit is mounted on the carriage 403. The liquid discharge head 101 of the liquid discharge device 200 discharges color liquids of, for example, yellow (Y), cyan (C), magenta (M), and black (K). In addition, the liquid discharge head 101 is mounted such that a nozzle row including multiple nozzles is arranged in a sub-scanning direction E orthogonal to the main scanning direction D and a direction in which the liquid is discharged from the liquid discharge head 101 is directed downward.

The liquid discharge head 101 is connected to the above-described liquid circulation device 600, and liquid of desired colors is circulated and supplied.

The image forming apparatus 500 includes a conveyance mechanism 495 for conveying a sheet 410. The conveyance mechanism 495 includes a conveyance belt 412 that serves as a conveyor and a sub-scanning motor 416 to drive the conveyance belt 412.

The conveyance belt 412 attracts the sheet 410 and conveys the sheet 410 to a position facing the liquid discharge head 101. The conveyance belt 412 is an endless belt stretched between a conveyance roller 413 and a tension roller 414. The attraction of the sheet 410 can be performed by, for example, electrostatic adsorption or air suction.

When the conveyance roller 413 is rotationally driven by the sub-scanning motor 416 via a timing belt 417 and a timing pulley 418, the conveyance belt 412 is circularly moved in the sub-scanning direction E.

On one end of the carriage 403 in the main scanning direction D, a maintenance mechanism 420 that maintains and recovers the liquid discharge head 101 is disposed lateral to the conveyance belt 412.

The maintenance mechanism 420 includes, for example, a cap 421 to cap a nozzle face, i.e., a face on which nozzles are formed, of the liquid discharge head 101 and a wiper 422 to wipe the nozzle face.

The main-scanning moving mechanism 493, the maintenance mechanism 420, and the conveyance mechanism 495 are installed to a housing including the side plates 491A and 491B and a back plate 491C.

In the image forming apparatus 500 having the above-described configuration, the sheet 410 is fed and attracted to the conveyance belt 412 and conveyed in the sub-scanning direction E by the circumferential movement of the conveyance belt 412.

The liquid discharge head 101 is driven in response to an image signal while moving the carriage 403 in the main scanning direction D to discharge the liquid to the sheet 410 not in motion. Thus, the image forming apparatus 500 forms an image.

Figure 14:
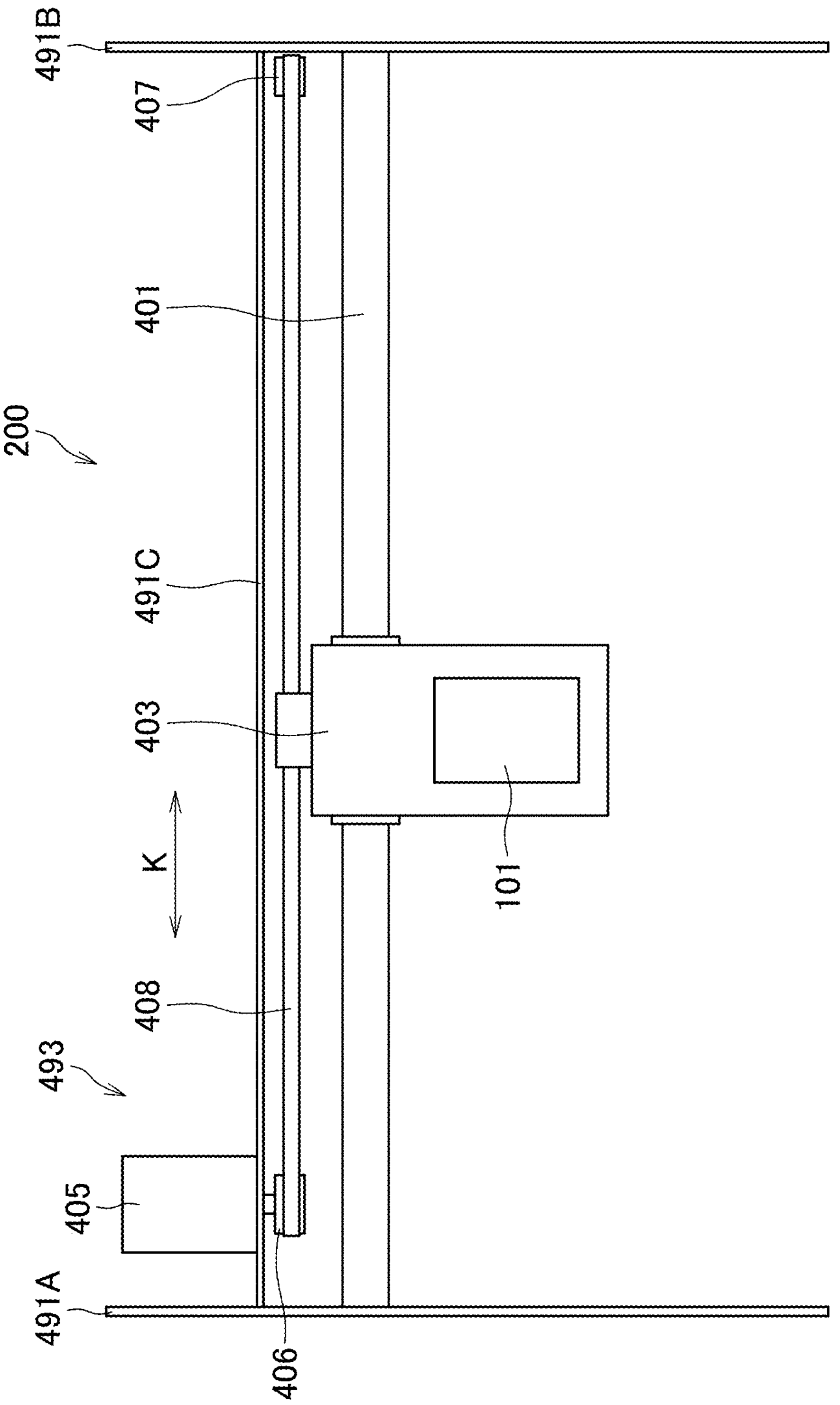
FIG. 14 is a plan view of a relevant part of a liquid discharge device according to another embodiment of the present disclosure.

Next, another example of the liquid discharge device according to an embodiment of the present disclosure is described below with reference to FIG. 14. FIG. 14 is a plan view of a relevant part of a liquid discharge device 2(*k*) according to the present embodiment.

The liquid discharge device 200 according to the present embodiment includes a housing that includes the side plates 491A and 491B and the back plate 491C, the main-scanning moving mechanism 493, the carriage 403, and the liquid discharge head 101, among the components of the image forming apparatus 500 as the liquid discharge apparatus described above.

Note that a liquid discharge device may have a configuration in which the above-described maintenance mechanism 420 is further attached to, for example, the side plate 491B of the liquid discharge device 200.

Figure 15:
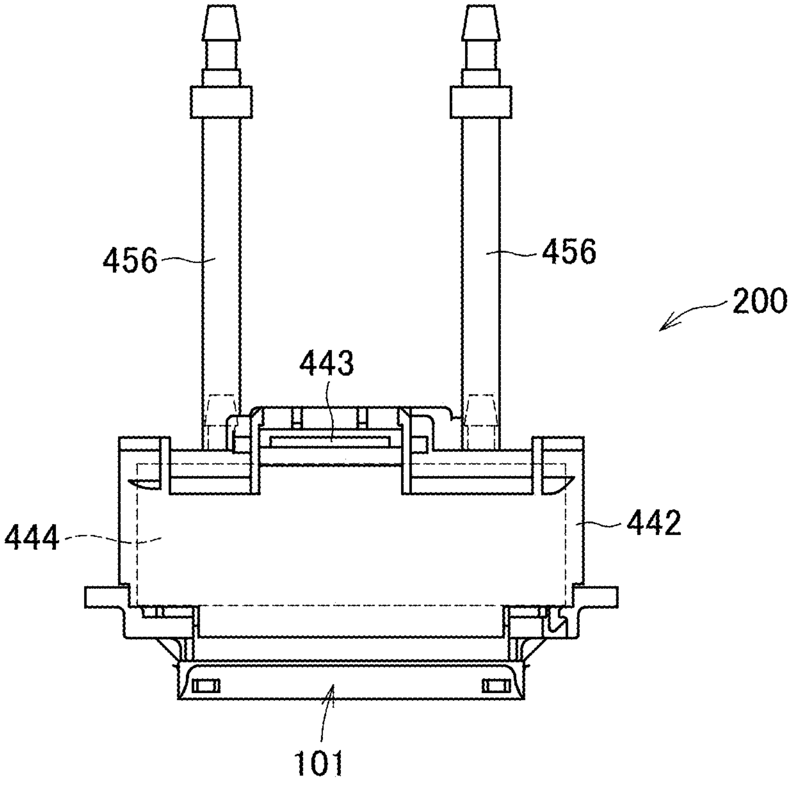
FIG. 15 is a front view of a main part of a liquid discharge device according to still another embodiment of the present disclosure.

Next, another example of the liquid discharge device 200 according to an embodiment of the present disclosure is described below with reference to FIG. 15. FIG. 15 is a front view of the liquid discharge device 200 according to the present embodiment.

The liquid discharge device 200 includes the liquid discharge head 101 to which a channel component 444 is attached, and tubes 456 connected to the channel component 444.

The channel component 444 is disposed inside a cover 442. The head tank 1 (see FIG. 13) may be included instead of the channel component 444. A connector 443 for electrically connecting to the liquid discharge head 101 is disposed above the channel component 444.

Providing the liquid discharge head disposed in the liquid discharge apparatus or the liquid discharge device described above with reference to FIGS. 9, 10, 11, 12, 13, 14, and 15 with the above-described damper film 22 as a film or the cover 23, or providing the head tank of the liquid discharge device with above-described damper film 22 as a film or the cover 23 can reduce the rupture of the film 22.

The present disclosure is not limited to the embodiments described above, and various modifications and improvements are possible without departing from the gist of the present disclosure.

In the present disclosure, the liquid to be discharged is not limited to a particular liquid as long as the liquid has a viscosity or surface tension to be discharged from a liquid discharge head. However, preferably, the viscosity of the liquid is not greater than 30 mPa·s under ordinary temperature and ordinary pressure or by heating or cooling. More specifically, examples of the liquid include a solution, a suspension, or an emulsion that contains, for example, a solvent such as water and an organic solvent, a colorant such as dye and pigment, a functional material such as a polymerizable compound, a resin, and a surfactant, a biocompatible material such as deoxyribonucleic acid (DNA), amino acid, protein, and calcium, or an edible material such as a natural colorant. Such a solution, a suspension, and an emulsion are used for, for example, inkjet ink, a surface treatment solution, a liquid for forming components of an electronic element and a light-emitting element or a resist pattern of an electronic circuit, or a material solution for three-dimensional fabrication.

Examples of an energy source for generating energy to discharge liquid include a piezoelectric actuator (a laminated piezoelectric element or a thin-film piezoelectric element), a thermal actuator that employs a thermoelectric conversion element, such as a thermal resistor, and an electrostatic actuator including a diaphragm and opposed electrodes.

The liquid discharge device is an integrated device including the liquid discharge head and a functional part(s) or unit(s), and is an assembly of parts related to liquid discharge. Examples of the discharge device include, in addition to the liquid discharge head, a combination of a discharge head with a head tank, a carriage, a supply mechanism, a maintenance mechanism a main-scanning movement mechanism, and a liquid circulation device.

In the present embodiment, the terms "combined" or "integrated" mean attaching the liquid discharge head and the functional parts or mechanism to each other by fastening, screwing, binding, or engaging and holding one of the liquid discharge head and the functional parts to the other movably relative to the other. Further, liquid discharge head, a functional component(s), and a mechanism(s) may also be detachably attached to one another.

For example, a head and a head tank may form a liquid discharge device as a single unit. Alternatively, a liquid discharge head to which a cover is attached and a head tank coupled or connected with, for example, a tube may form a liquid discharge device as a single unit. In the present embodiment, a unit including a filter may further be added to a portion between the head tank and the liquid discharge head.

In another example, a liquid discharge head and a carriage may form a liquid discharge device as a single unit.

In still another example, the liquid discharge device may include the liquid discharge head movably held by a guide that forms a part of a main-scanning movement device, so that the liquid discharge head and the main-scanning movement device are integrated as a single unit. In still another example, a liquid discharge device may include a head, a carriage, and a main scan movement unit that form a single unit.

In still another example, a cap that forms part of the maintenance mechanism is secured to the carriage mounting the liquid discharge head so that the liquid discharge head, the carriage, and the maintenance mechanism are integrated as a single unit to form the liquid discharge device.

Further, in still another example, a liquid discharge device may include tubes connected to a head mounting a head tank or a channel so that the head and a supply unit form a single unit. Through the tubes, liquid of a liquid storage source is supplied to the liquid discharge head.

The main-scanning moving mechanism may include a single piece of guide. The supply unit may include a single piece of tube and a single piece of loading unit.

In the present disclosure, the term "liquid discharge apparatus" includes a liquid discharge head or a liquid discharge device (unit) and drives the liquid discharge head to discharge liquid. The term "liquid discharge apparatus" used here includes, in addition to apparatuses to discharge liquid to materials to which the liquid can adhere, apparatuses to discharge the liquid into gas (air) or liquid.

The liquid discharge apparatus can include a unit related to feeding, conveyance, and discharge of an object to which a liquid can adhere, a pretreatment apparatus, a post-treatment apparatus.

Examples of the liquid discharge apparatus include an image forming apparatus which is an apparatus that forms an image on a sheet by discharging ink, and a stereoscopic fabrication apparatus (three-dimensional fabrication apparatus) which discharges fabrication liquid to a powder layer in which powder is formed in a layer shape to fabricate a stereoscopic fabrication object (three-dimensional object).

Such a liquid discharge apparatus is not limited to an apparatus that discharge liquid to visualize meaningful images, such as letters or figures. For example, an apparatus that forms a meaningless pattern, or an apparatus that fabricates a three-dimensional image are also included.

The above-described term "material to which liquid can be adhered" represents a material to which the liquid is at least temporarily adhered, a material to which the liquid is adhered and fixed, or a material into which liquid is adhered to permeate. Examples of the "material to which liquid can be adhered" include recording media, such as sheet of paper, recording paper, recording sheet of paper, film, and cloth, electronic components, such as electronic substrate and piezoelectric element, and media, such as powder layer, organ model, and testing cell. The "material to which liquid can be adhered" includes any material to which liquid is adhered, unless particularly limited.

Examples of the above-described material to which liquid is adherable include any materials to which liquid can adhere even temporarily, such as paper, thread, fiber, fabric, leather, metal, plastic, glass, wood, and ceramic.

The liquid discharge apparatus can be an apparatus in which the liquid discharge head and a material to which liquid can adhere move relatively to each other. However, the liquid discharge apparatus is not limited to such an apparatus. Examples of the liquid discharge apparatus include a serial-type apparatus which moves the liquid discharge head, and a line-type apparatus which does not move the liquid discharge head.

Other examples of the liquid discharge device include a treatment liquid application device that discharges treatment liquid to a sheet to apply the treatment liquid to the surface of the sheet for the purpose of modifying the surface of the sheet, and an injection granulation device that injects composition liquid in which a raw material is dispersed in a solution through a nozzle to granulate fine particles of the raw material.

The terms, image formation, recording, printing, image printing, and fabricating used herein can be used synonymously with each other.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. A liquid discharge device comprising:

a liquid discharge head;

a head tank to store liquid to be supplied to the liquid discharge head, the head tank including:

a body having a hole;

a film covering the hole and including a fixed portion fixed to the body; and a cover to contact the film from an outer surface of the film, the cover including a fixing-side cover part to contact a portion adjacent to the fixing portion of the film, the fixing-side cover part having a curved contact surface to contact the film, wherein the cover includes a center-side cover part to contact a portion of the film that is closer to a center of the film than the portion adjacent to the fixing portion of the film.

2. The liquid discharge device according to claim 1, wherein the curved contact surface of the fixing-side cover part has a radius of curvature larger than a length of the film in a short-side direction of the film.

3. The liquid discharge device according to claim 1, wherein the cover includes an elastic material.

4. The liquid discharge device according to claim 1, wherein the center-side cover part has a mesh shape.

5. The liquid discharge device according to claim 1, wherein the fixing-side cover part and the center-side cover part include a plurality of linear portions, and wherein a width of a linear portion of the fixing-side cover part is larger than a width of a linear portion of the center-side cover part.

6. The liquid discharge device according to claim 1, wherein the center-side cover part has a greater density in an area closer to the fixing-side cover part than in an area closer to the center of the film.

7. A liquid discharge apparatus comprising the liquid discharge device according to claim 1.

8. The liquid discharge device according to claim 1, wherein:

the film is a damper film.

9. The liquid discharge device according to claim 1, wherein:

the film is fixed to the body by a weld.

10. The liquid discharge device according to claim 1, wherein:

the damper includes an elastic material.

11. The liquid discharge device according to claim 1, wherein:

the center-side cover part includes linear portions in a meshed pattern.

12. The liquid discharge device according to claim 1, wherein:

the fixing-side cover part is a window frame disposed adjacent to the fixing portion of the film to surround an inner portion of the film with respect to the fixing portion of the film.

13. The liquid discharge device according to claim 1, wherein:

a width of the fixing-side cover part is larger than a width of the center-side cover part.

14. The liquid discharge device according to claim 1, further comprising:

a sub tank connected to the head tank; and an air pump connected to the sub tank.

15. The liquid discharge device according to claim 14, further comprising:

an air release valve connected to the sub tank.

16. The liquid discharge device according to claim 14, further comprising:

a cartridge;

a pump connected between the cartridge and the sub tank.

* * * * *